(12) United States Patent
Farage et al.

(10) Patent No.: US 6,797,902 B2
(45) Date of Patent: Sep. 28, 2004

(54) ILLUMINABLE COMPUTER KEYBOARD

(75) Inventors: Paul G. Farage, Zeeland, MI (US); Matt Simms, Plainfield Township, MI (US)

(73) Assignee: Sotai Ltd., Grand Rapids, MI (US)

( * ) Notice: Subject to any disclaimer, the term of this patent is extended or adjusted under 35 U.S.C. 154(b) by 0 days.

(21) Appl. No.: 10/183,623

(22) Filed: Jun. 27, 2002

(65) Prior Publication Data

US 2003/0000817 A1 Jan. 2, 2003

Related U.S. Application Data

(60) Provisional application No. 60/302,075, filed on Jun. 27, 2001.

(51) Int. Cl.⁷ ................................................. H01H 9/16
(52) U.S. Cl. ........................................................ 200/314
(58) Field of Search ............................................ 200/314

(56) References Cited

U.S. PATENT DOCUMENTS

| | | | |
|---|---|---|---|
| 4,060,703 A | 11/1977 | Everett, Jr. | |
| 4,471,189 A | 9/1984 | Bacon et al. | |
| 4,489,227 A | 12/1984 | Lamarche | |
| 4,532,395 A | * 7/1985 | Zukowski | .................. 200/314 |
| 4,563,550 A | 1/1986 | Bertina | |
| 4,683,359 A | * 7/1987 | Wojtanek | .................. 200/314 |
| 4,772,769 A | 9/1988 | Shumate | |
| 4,812,831 A | 3/1989 | Laier | |
| 4,993,808 A | 2/1991 | Braakman | |
| 5,164,723 A | 11/1992 | Nebenzahl | |
| 5,234,744 A | 8/1993 | Kenmochi | |
| 5,544,020 A | 8/1996 | Loeber et al. | |
| 5,612,692 A | 3/1997 | Dugas et al. | |
| 5,684,513 A | 11/1997 | Decker | |
| 5,697,493 A | * 12/1997 | Sach et al. | .................. 200/314 |
| 5,793,358 A | 8/1998 | Petkovic et al. | |
| 5,801,345 A | 9/1998 | Mikula-Curtis et al. | |
| 5,818,361 A | 10/1998 | Acevedo | |
| 5,936,554 A | 8/1999 | Stanek | |
| 5,971,557 A | 10/1999 | Kubes et al. | |
| 6,067,074 A | 5/2000 | Lueders | |
| 6,179,432 B1 | 1/2001 | Zhang et al. | |

OTHER PUBLICATIONS

Sipex Electroluminescent Lamp Driver with 4-Level Light Intensity Selection Feature, Copyright 1999, Sipex Corporation.

* cited by examiner

*Primary Examiner*—Renee Luebke
(74) *Attorney, Agent, or Firm*—Van Dyke, Gardner, Linn & Burkhart, LLP

(57) ABSTRACT

An illuminable keyboard includes a plurality of lights, such as electroluminescent lights, sized and positioned to illuminate one or more of the individual keys on a keyboard. More than one electroluminescent light may be included on an individual key to thereby allow different portions of the key to be illuminated. Each of the electroluminescent lights may be controlled independently of the other lights. A controller for controlling each of the electroluminescent lights allows a computer to activate selected ones of the lights, control the brightness of the selected lights, and also the color of the individually illuminated lights.

23 Claims, 5 Drawing Sheets

ILLUMINABLE COMPUTER KEYBOARD

CROSS REFERENCE TO RELATED APPLICATIONS

This application claims priority to U.S. provisional application Ser. No. 60/302,075 filed Jun. 27, 2001, the disclosure of which is hereby incorporated herein by reference.

BACKGROUND OF THE INVENTION

This invention relates generally to keyboards and more particularly to keyboards which are illuminated by light.

Keyboards, such as those that are used in conjunction with computers, have been known in the past to be illuminated for facilitating their use in low light conditions. Such prior art illuminated keyboards, however, have suffered from several different disadvantages. One such disadvantage is the excessive consumption of electrical power. Another disadvantage involves the lack of control over the illumination of the keyboard. Furthermore, prior art illuminated keyboards have often been constructed of relatively expensive components. The desirability of an illuminated keyboard that overcomes these and other disadvantages can therefore be seen.

SUMMARY OF THE INVENTION

Accordingly, the present invention provides an illuminated keyboard that overcomes these and other disadvantages. A keyboard according to one aspect of the present invention includes at least one translucent, depressible key. A first light is included and is sized and positioned to illuminate substantially the entirety of the at least one key when the first light is illuminated. A second light is also provided and is sized and positioned to illuminate less of the at least one key than the first light when the second light is illuminated.

According to another aspect of the present invention, an illuminated keyboard is provided which includes a plurality of translucent, depressible keys. A plurality of large, lights are also provided. Each of the large lights are sufficiently sized to illuminate substantially an entire one of the plurality of keys. A plurality of small lights are also provided. Each of the small lights are sized to illuminate only a portion of one of the plurality of keys.

According to still other aspects of the present invention the lights may be electroluminescent lights, or other types of lights, such as light-emitting diodes (LED's), white LED's, fiber optic lights, or other types of lights. A controller may be provided for selectively illuminating the different lights independently from each other. The keyboard may include one or more triacs which are controlled by the controller and allow current to flow to the lights in a controllable manner. The lights of the present invention may also be positioned on top of a circuit board that outputs an electrical signal when one or more of the keys are pressed. The controller may further be adapted to selectively alter the frequency of electrical power to the lights, and/or to selectively alter the brightness by which the lights are illuminated.

The present invention provides a keyboard that uses less electrical power than various prior art illuminated keyboards. The keyboard can be controlled by a computer or other electronic device in a variety of different manners. The brightness, color, and/or individual lights that are illuminated can be dictated by the computer or other control device. These and other benefits of the present invention will be apparent to one skilled in the art in light of the following specification when read in conjunction with the accompanying drawings.

DESCRIPTION OF THE PREFERRED EMBODIMENTS

Figure 1:
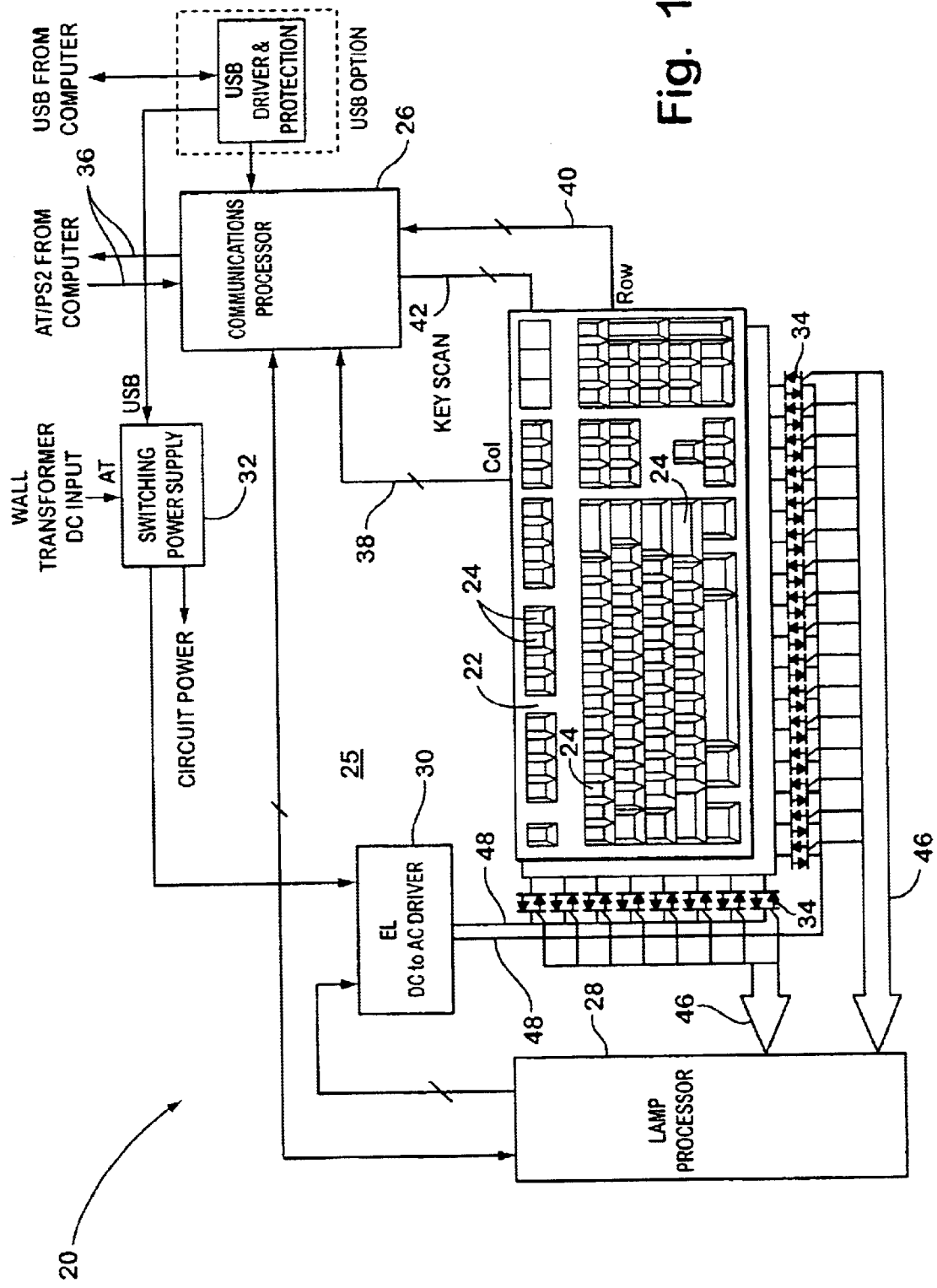
FIG. 1 is a block diagram of an illuminable keyboard according to one aspect of the present invention.

The present invention will now be described with reference to the accompanying drawings wherein like reference numerals correspond to like elements in the several drawings. An illuminable keyboard 20 according to one aspect of the present invention is depicted in block diagram form in FIG. 1. Illuminable keyboard 20 includes a frame 22 and a plurality of depressible keys 24. As can be seen in FIG. 1, keys 24 are arranged on frame 22 in a conventional manner that is commonly used in conjunction with a computer. Specifically, keys 24 include individual keys for all the letters of the alphabet, the numerals 0–9, various character keys, and a plurality of function keys. It will of course be understood by those skilled in the art that illuminable keyboard 20 can take on a variety of different forms from that depicted in FIG. 1. For example, illuminable keyboard 20 may include only a number pad, or some other subset of the total keys 24 depicted in FIG. 1. Keyboards with additional keys are also contemplated within the scope of the present invention. Further, illuminable keyboard 20 finds application in keyboards other than those used for controlling a computer, such as touch pad screens on telephones, calculators, and any other type of device having keys which are desirably illuminated.

Each of keys 24 on keyboard 20 are preferably made from a translucent material to thereby allow light underneath the key to pass through the individual key. As will be described in more detail below, at least one light is positioned underneath each key 24. The light may be made of electroluminescent material, or constructed in another manner. For purposes of illustration only, the invention will hereinafter be described using electroluminescent lights, although it will be understood that the invention finds equal application to other types of lights. The illumination of these lights is controlled by a controller 25 depicted in block diagram form in FIG. 1. Controller 25 includes a communications processor 26, a lamp processor 28, an electroluminescent light driver 30, a power supply 32, a plurality of triacs 34, and suitable wiring or other conductors for allowing each of these components to operate and interact with each other.

Communications processor 26 includes a computer interface 36 which may be a standard computer interface, such as the IBM AT or PS2 keyboard interface. Any other types of interfaces that allow communication between keyboard 20 and a computer can be used within the scope of the present invention. For example, processor 26 in FIG. 1 is also attached to a Universal Serial Bus (USB) port for allowing a device attached via a USB connection to communicate with communications processor 26 and thereby control the illumination of the keys 24 of keyboard 20. Communications processor 26 is responsible for controlling the communications between keyboard 20 and an attached computer or other device. In the illustrated embodiment, communications processor 26 includes sixteen column inputs 38 and eight row inputs 40. These inputs indicate to communications processor 26 when a particular key on keyboard 20 is pressed. Each key 24 on keyboard 20 is electrically coupled, when pressed, to a unique combination of columns and rows. When a particular key is pressed, an electrical circuit is completed through a particular column and particular row. Communications processor 26 is able to determine which individual key or keys have been pressed by analyzing column and row inputs 38 and 40. The manner in which communications processor 26 determines which key or keys have been pressed can be accomplished in a known manner. Communications processor 26 further includes, in the illustrated embodiment, three light outputs 42 for selectively illuminating the standard lights that appear on the keyboard when the number lock, caps lock, or scroll lock keys are pressed. The lighting of these keys is also accomplished in a known manner.

Communications processor 26 is also in communication with lamp processor 28. Lamp processor 28 controls the illumination of the individual keys, or portions of keys, that are to be illuminated by the underlying electroluminescent lights. Based on commands received from a computer, communications processor 26 tells lamp processor 28 which particular key or portion of a key should be illuminated. Communications processor 26 further indicates to lamp processor 28 the level of brightness by which the individual key or portion of a key should be illuminated. Further, communications processor 26 may also indicate to lamp processor 28 the particular frequency of the AC signal by which the individual electroluminescent light should be powered. By supplying power to the individual electroluminescent lights at varying frequencies, the color of the illumination of the electroluminescent light can be varied.

Lamp processor 28 is coupled to a plurality of triacs 34 by a plurality of column lines 44 and row lines 46. Each of the individual column lines feed into one of the eight triacs 34 while each of the column lines 44 feed into one of the sixteen individual row triacs 34. In particular, column and row lines 44 and 46 each feed into the gate input of the respective triac. When the gate input is activated, the particular triac 34 allows AC current to flow between its two main terminals. One of the main terminals of each of the triacs 34 is connected to the electroluminescent light driver 30 by way of a power line 48. The other main terminal of each of the triacs 34 is connected to a plurality of individual electroluminescent lights within keyboard 20. Specifically, each main terminal of the row triacs 34 is connected to sixteen different electroluminescent lights. Conversely, each of the column triacs is connected to up to eight separate electroluminescent lights. By activating the gate of one of the row triacs 34 and the gate of one of the column triacs 34, an individual electroluminescent light on keyboard 20 will be illuminated. If only one triac 34 is activated, and not a pair of triacs, no electroluminescent lights will be illuminated as a complete circuit is not formed between light driver 30 and any particular electroluminescent light. Thus, by choosing which particular row triacs to activate and which particular column triac to activate (i.e., a unique row-column address), the illumination of any individual key can be controlled.

Lamp processor 28 may also be programmed to control the frequency of the power that is supplied to each electroluminescent light through lamp driver 30. The selected frequency is based on a command received from communications processor 26. By varying the frequency of the power supplied to the electroluminescent lights, it is possible to alter the color of the light emitted from some electroluminescent lights. An attached computer may therefore send a command to communications processor 26 indicating which key or keys should be illuminated and in which color. Communications processor 26 converts this command to an appropriate lower level communication to lamp processor 28 to thereby select the appropriate frequency of the power to be supplied to a particular light. In one embodiment, lamp processor 28 only illuminates one individual key at a time. The duration of the lighting of each key is a small fraction of a second. After an individual light has been lit for this fraction of a second, the next light on keyboard 20 that is to be illuminated is lit up for a fraction of a second. And after that one is turned off, the next one is lit up for a fraction of a second. By this method of scanning through the keys and illuminating the appropriate areas for a non-overlapping fraction of a second, it is possible to power each individual key with power of a unique frequency. Thus, the color of each key can be controlled independently of the color of the other keys. In this manner it is also possible to control the brightness of each individual illuminated key independently from other keys by adjusting the power supplied by driver 30 at the appropriate times. Preferably, the scanning illumination of individual keys is sufficiently fast to avoid any visually-apparent flickering of the illuminated lights.

Electroluminescent light driver 30 receives inputs from lamp processor 28 and power supply 32. Power supply 32 provides a DC voltage, such as 5 volts, to electroluminescent light driver 30. Light driver 30 converts this DC voltage into an AC voltage, which is necessary to illuminate the electroluminescent lights on keyboard 20. In the illustrated embodiment, light driver 30 converts the 5 volt input from power supply 32 into a 140 volt AC output at a frequency of approximately 400 hertz. If desired, light driver 30 can vary the frequency of the output power based upon instructions from lamp processor 28.

While other types of components can be used within the scope of the present invention, communications processor 26 is, in the illustrated embodiment, a processor manufactured by Microchip Technology, Inc. of Chandler, Ariz. having part number PIC16C765. Also in the illustrated embodiment, lamp processor 28 is a processor manufactured by Microchip Technology, Inc. bearing the part number PIC16C74. Electroluminescent light driver 30, in the illustrated embodiment, is any one of a family of lamp drivers manufactured by Sipex Corporation of Billerica, Mass. having part number SP44xx, where the latter two x's indicate variable part numbers. Power supply 32 can be any conventional power supply which receives power from a power input. The power input may be separate from the computer input into communications processor 26, or the two may be combined together into a single cord.

Figure 2:
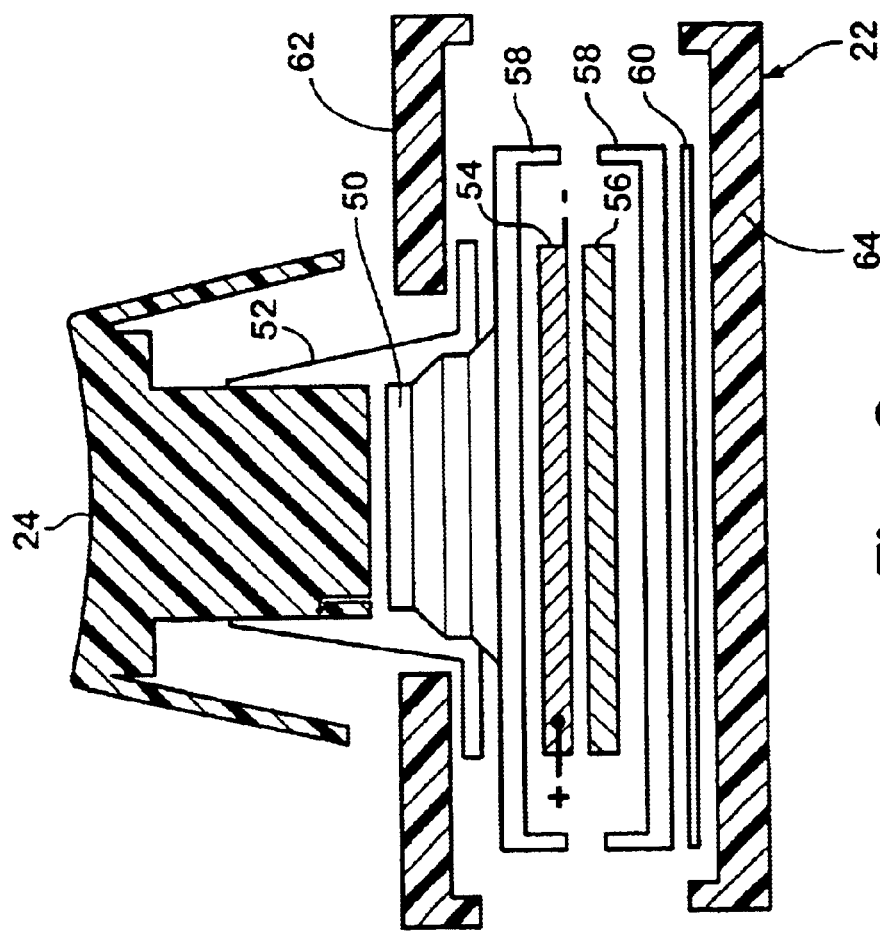
FIG. 2 is a sectional, elevational, exploded view of an individual key and section of a keyboard.

A sectional view of an individual key 24, along with a portion of keyboard 20, is depicted in exploded view in FIG. 2. Key 24, which is preferably translucent, may be manufactured in any standard form. Key 24 is mounted to a flexible spring 50 by way of a sleeve 52 in a known manner. Flexible spring 50 is made from a rubbery type of material that resiliently biases key 24 in a non-depressed position. An electroluminescent light 54 is positioned under flexible spring 50. Electroluminescent light 54 is positioned on top of a circuit board 56. Electroluminescent light 54 and circuit board 56 are encased within a lamination 58. A base plate 60 is positioned underneath the lamination layer 58 and provides rigidity and structural support to keyboard 20. Electroluminescent light 54, circuit board 56, lamination 58 and base plate 60 are surrounded by an upper half 62 and a lower half 64 of frame 22, which are secured together during the final assembly of keyboard 20. While electroluminescent light 54 is depicted in FIG. 2 as having a length generally equal to that of an individual key 24, it will be understood that electroluminescent light 54, in the preferred embodiment, is part of a single layer of material having an area approximately equal to the total area of all the keys which are to be illuminated. Onto this single layer are deposited multiple, discrete electroluminescent lights 54, only one of which is pictured in FIG. 2. Such depositing of the lights and the electrical conductors can be accomplished in a known manner. While other types of lights can be used, the electroluminescent lights of the present invention are preferably manufactured by MetroMark, Inc. of Minnetonka, Minn., and are deposited onto a substrate or layer in the desired shapes. The individual electroluminescent lights 54 are positioned beneath each of the keys 24 on keyboard 20.

Circuit board 56 generally has an area equal to the area of the total number of keys 24 on keyboard 20. Circuit board 56 serves to determine when an individual key or keys are pressed and sends signals indicating the pressing of one or more keys to communications processor 26. Circuit board 56 therefore extends underneath all of the keys 24. Lamination 58 surrounds the entire circuit board 56 as well as the entire layer on which electroluminescent lights 54 are incorporated. Lamination 58 forms a watertight seal around electroluminescent lights 54 and circuit board 56 to thereby allow keyboard 20 to be immersed in water without losing functionality. Only a single wire needs to extend from the inside of lamination 54 to the outside and such a single wire can be adhered to the lamination in a known manner to create the waterproofing of the keyboard. The layer of the electroluminescent lights 54 includes electrical contacts mounted on its underside underneath each key 24 (not shown). When an individual key is pressed, flexible spring 50 collapses and pushes against the underlying electroluminescent light. The contact on the underside of electroluminescent light 54 is then pushed into contact with circuit board 56, thereby providing the indication that the individual key has been pressed.

Figure 3:
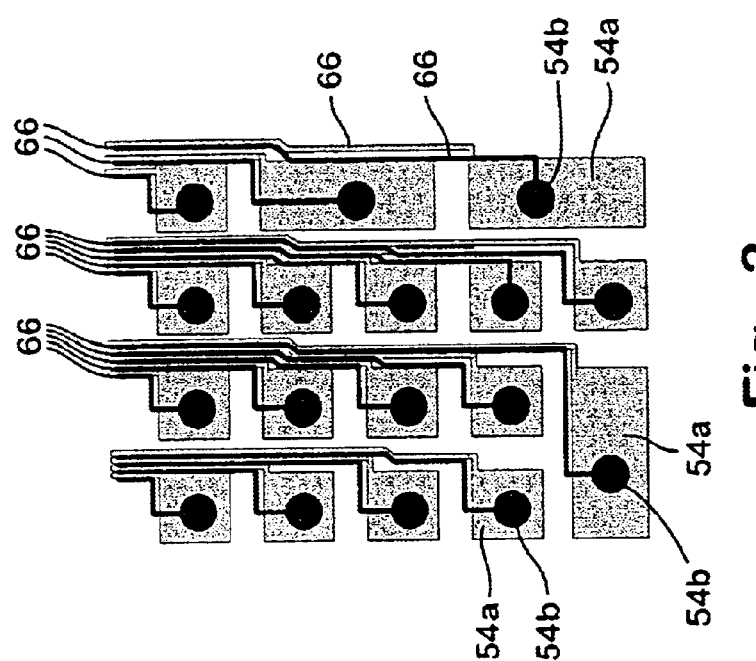
FIG. 3 is a plan view of a plurality of electroluminescent lights.

FIG. 3 illustrates a plan view of a plurality of electroluminescent lights 54. In this particular illustration, the lamps are arranged in a pattern that might underlie a typical number pad on a computer keyboard. The electroluminescent lights depicted in FIG. 3 include large electroluminescent lamps 54a and small electroluminescent lights 54b. The large electroluminescent lights 54a are generally dimensioned with an area substantially equal to the area of the key 24 which resides above the light. The small electroluminescent lights 54b, on the other hand, have an area substantially smaller than the area of the large electroluminescent light 54a that surrounds them. The purpose of small electroluminescent lights 54b is to illuminate only a portion of the individual key 24. While the precise portion can be any desired portion within the scope of the invention, one use of small electroluminescent lights 54b is to illuminate the individual indicia printed on the key 24. Thus, if a particular key includes the number "1" printed on the key 24, small electroluminescent light 54b may be dimensioned generally of the same size as the number 1 printed on key 24.

In such an embodiment, the large lights 54a illuminate the entire key while the small lights 54b illuminate only the particular indicia that is affixed to the top surface of the key. Each large and small electroluminescent light 54 includes a pair of power leads 66 (only one illustrated) which supply power for illuminating a respective electroluminescent light 54. Power leads 66 are coupled to one of the terminals of each of triacs 34. As illustrated in FIG. 1, when a particular combination of a row and column triac 34 is activated, an individual electroluminescent light 54 is illuminated. The particular light 54 that is illuminated may either be a large light 54a or a small light 54b. The keyboard illustrated in FIG. 1 includes more than 100 keys. With eight rows of triacs 34 and sixteen columns of triacs 34, there are 128 possible individual electroluminescent lights 54 that can be illuminated. These individual lights could be arranged such that a single light is positioned behind each individual key. Alternatively, there may be two or more lights, preferably of different sizes, positioned behind one or more of the keys. Because there are only controls for 128 individual lights depicted in FIG. 1, it is not possible to provide each individual key in FIG. 1 with both a large and small electroluminescent light 54a and b. If it were desirable to have both a large and small electroluminescent 54a and 54b with each individual key 24, additional rows or columns of triacs 34 could be added to the keyboard illustrated in FIG. 1.

Figure 4:
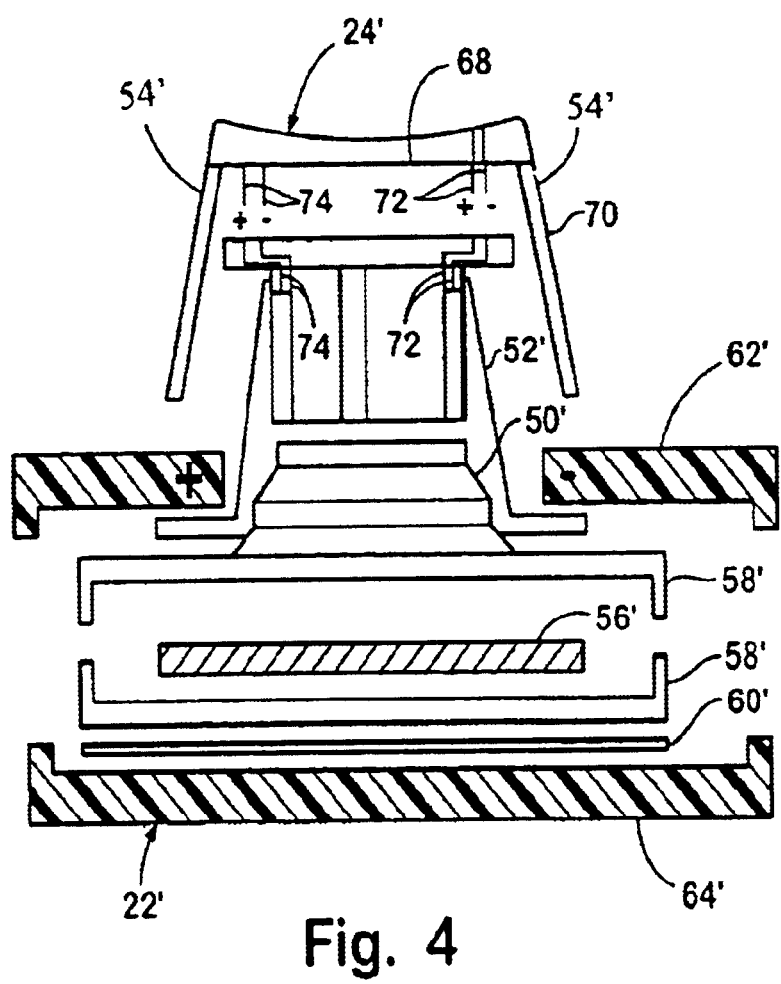
FIG. 4 is a sectional, elevational view of a key and a portion of a keyboard according to another aspect of the present invention.

FIG. 4 illustrates a sectional view of a second embodiment of a portion of a keyboard 20' according to a second embodiment of the present invention. The components of keyboard 20' that are the same or similar to keyboard 20 are labeled with the same numbers followed by a prime symbol. Illuminable keyboard 20' includes a frame 22' having an upper half 62' and a lower half 64'. A key 24' is attached to a sleeve 52' which is welded on a flexible spring 50'. A circuit board 56' is positioned under flexible spring 50 and surrounded by a lamination 58'. A base plate 60' is positioned underneath the laminated circuit board 56'. In the embodiment depicted in FIG. 4, at least a portion of the body of key 24' is manufactured from electroluminescent material. While the portion may include just a top portion 68, it is also contemplated that the electroluminescent material may be part of a side 70 of key 24'. Whatever the extent of the electroluminescent material, it may be desirable to include an exterior protective layer on top of the electroluminescent material to protect the electroluminescent material against wear and degradation. Such a protective layer is preferably translucent.

In the embodiment depicted in FIG. 4, the electroluminescent material is isolated into two discreet sections to thereby define two separate electroluminescent lights 54'. One of the electroluminescent lights receives power by a first set of power lines 72 while the other electroluminescent light receives power via a second set of power lines 74. First and second sets of power lines 72 and 74 are incorporated into sleeve 52' and are electrically coupled to upper half 62' of frame 22'. The power lines are then attached to triacs 34, or other suitable switching mechanisms, for selectively illuminating the individual electroluminescent lights 54'. While key 24', sleeve 52', and upper half 62' of frame 22' are depicted as separated from each other in FIG. 4, this separation is the result of the exploded nature of FIG. 4 and is only present for purposes of illustration. In the actual physical embodiment key 24' is both physically and electrically coupled to sleeve 52' which, in turn, is both physically and electrically coupled to the upper half of frame 22'. In the embodiment depicted in FIG. 4, an electrical contact (not shown) is positioned underneath flexible spring 50' and comes into contact with circuit board 56' when key 24' is pressed. This electrical contact enables circuit board 56' to send a signal to communications processor 26' indicating that the particular key has been pressed.

Figure 5:
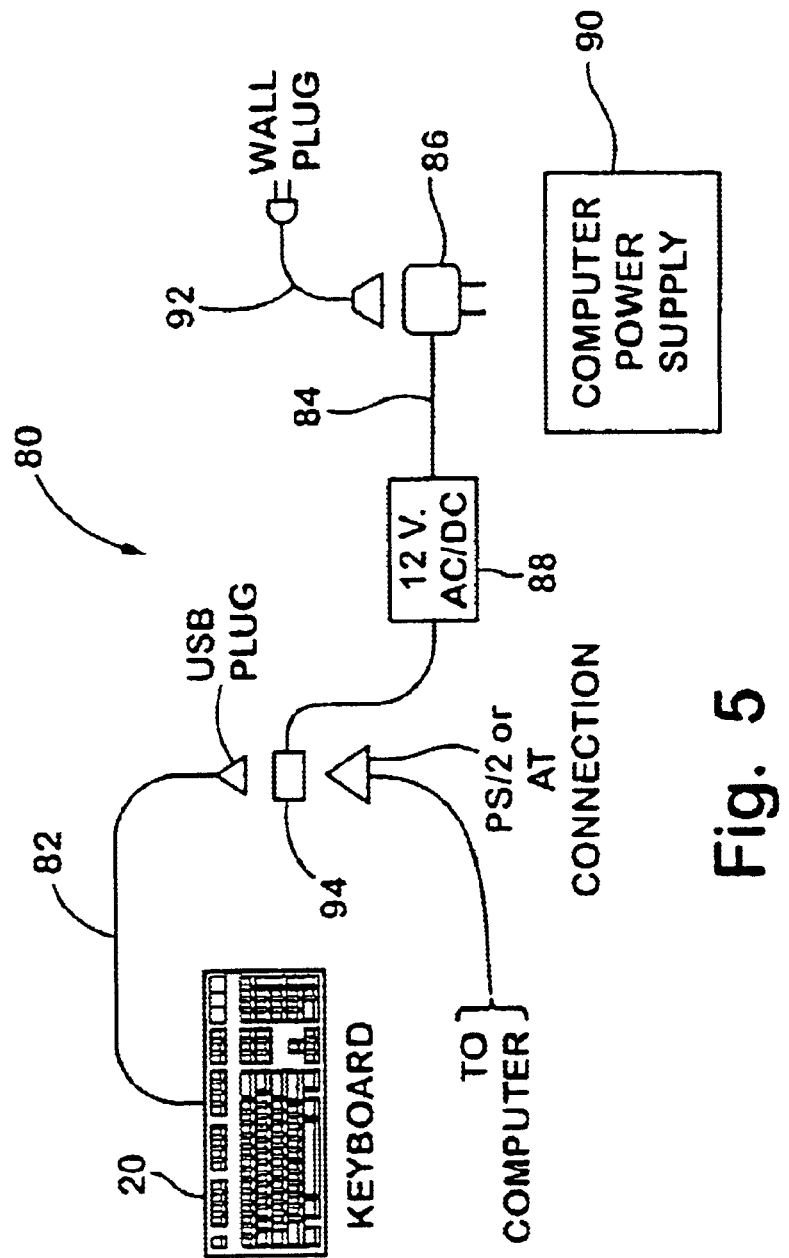
FIG. 5 is a diagram of one embodiment of a cable system for use with the present invention.

An example of a cable system 80 used in accordance with the keyboards of the present invention is depicted in a diagram format in FIG. 5. When keyboard 20 is to be used with a computer having a Universal Serial Bus (USB) port, a cable 82 having two USB ports can be plugged directly into keyboard 20 at one end and a computer at its other end. Because USB cables supply sufficient power to illuminate keyboard 20, no further cabling is required in such a situation. However, if keyboard 20 is to be used with a computer having either an AT or PS/2 connection for the keyboard, such connections may not allow sufficient power to be delivered to keyboard 20 to illuminate the keyboard. In such a case, a power cable 84 is provided. Power cable 84 includes an AC/DC power adapter 88 that converts the 120V AC power coming from a standard wall power outlet into a 12 volt DC signal which is used by keyboard 20. Power cable 84 further includes a power connector 86 which is adapted to fit between a computer power supply 90 and a cord 92 which connects power supply 90 to a wall or other power outlet. Connector 86 thus includes a plug for plugging it into one end of power supply 90 and a port for receiving one end of cord 92. At an end opposite connector 86, power cable 84 includes a USB/AT connector 94. Alternatively, power cable can include a USB/PS/2 connector for PS/2 applications. Connector 94 includes a USB plug on one side for inserting directly into keyboard 20 and either an AT or PS/2 port on its other side for receiving either an AT or PS/2 cable from the computer itself. Power cable 84 thus allows keyboard 20 to be used with computers having AT or PS/2 keyboard connections.

While the present invention has been described in terms of the preferred embodiments discussed in the above specification, it will be understood by one skilled in the art that the present invention is not limited to these particular preferred embodiments, but includes any and all such modifications that are within the spirit and scope of the present invention as defined in the appended claims.

What is claimed is:

1. An illuminable keyboard comprising:
   at least one translucent depressible key;
   a first light sized and positioned to illuminate substantially the entirety of said at least one key when said first light is illuminated; and
   a second light sized and positioned to illuminate less of said at least one key than said first light when said second light is illuminated, said first and second lights being electroluminescent lights, wherein said first and second electroluminescent lights are positioned underneath a spring adapted to bias said key toward a non-depressed position.

2. The keyboard of claim 1 further including:
   at least a second translucent depressible key;
   a third electroluminescent light sized and positioned to illuminate substantially the entirety of said second key when said third electroluminescent light is illuminated; and
   a fourth electroluminescent light sized and positioned to illuminate less of said second key than said third electroluminescent light when said fourth electroluminescent light is illuminated.

3. The keyboard of claim 1 wherein said first electroluminescent light has a length and width substantially equal to a length and width of said at least one key.

4. The keyboard of claim 1 wherein said at least one key includes a top with indicia printed on it and said second electroluminescent light has an area substantially equal to an area of said indicia.

5. The keyboard of claim 1 further including a circuit board positioned underneath said first and second electroluminescent lights, said circuit board outputting an electrical signal when said at least one key is pressed.

6. The keyboard of claim 1 wherein said first and second electroluminescent lights are positioned adjacent a bottom of said at least one key.

7. An illuminable keyboard comprising:
   at least one translucent depressible key;
   a first light sized and positioned to illuminate substantially the entirety of said at least one key when said first light is illuminated; and
   a second light sized and positioned to illuminate less of said at least one key than said first light when said second light is illuminated, said first and second lights being electroluminescent lights, wherein said first and second electroluminescent lights form at least a portion of an outer wall of said at least one key.

8. The keyboard of claim 7 further including a controller adapted to selectively alter the frequency of electrical power supplied to said first and second electroluminescent lights.

9. The keyboard of claim 7 further including a controller adapted to selectively alter the brightness by which said first and second electroluminescent lights are illuminated.

10. The keyboard of claim 7 further including a controller adapted to selectively illuminate said first and said second electroluminescent lights independently from each other.

11. The keyboard of claim 10 further including at least a first triac and at least a second triac, said first triac allowing current to flow to said first electroluminescent light when said controller activates said first triac, said second triac allowing current to flow to said second electroluminescent light when said controller activates said second triac.

12. The keyboard of claim 10 wherein said controller is adapted to illuminate only one of said first and said second electroluminescent lights at any particular time.

13. An illuminable keyboard comprising:
    a plurality of translucent, depressible keys;
    a plurality of large lights, each of said large lights being sufficiently sized to illuminate substantially an entire one of said plurality of keys; and
    a plurality of small lights, each of said small lights being sized to illuminate only a portion of one of said plurality of keys, said large and small lights being electroluminescent, wherein said large and small electroluminescent lights form at least a portion of an outer wall of each of said plurality of keys.

14. The keyboard of claim 13 wherein said large and small electroluminescent lights are positioned underneath springs adapted to bias said plurality of keys toward a non-depressed position.

15. The keyboard of claim 13 wherein at least some of said plurality of keys each include a top with indicia printed on it and each of said small electroluminescent lights have areas substantially equal to the area of said indicia.

16. The keyboard of claim 13 further including a controller adapted to selectively alter the frequency of electrical power supplied to said large and small electroluminescent lights.

17. The keyboard of claim 13 wherein said keys include tops with indicia on them, said indicia including all the characters of the alphabet.

18. The keyboard of claim 13 further including a circuit board positioned underneath said large and small electroluminescent lights, said circuit board outputting an electrical signal whenever one of said keys are pressed.

19. The keyboard of claim 13 further including a controller adapted to selectively alter the brightness by which said large and small electroluminescent lights are illuminated.

20. The keyboard of claim 13 further including a controller adapted to selectively illuminate said large and small electroluminescent lights independently from each other.

21. The keyboard of claim 20 further including a plurality of first triacs and a plurality of second triacs, said first triacs allowing current to flow to individual ones of said large electroluminescent lights when said controller activates selected ones of said first triacs, said second triacs allowing current to flow to individual ones of said small electroluminescent lights when said controller activates selected ones of said second triacs.

22. The keyboard of claim 20 wherein said controller is adapted to illuminate only a single one of said large and small electroluminescent lights at any particular time.

23. The keyboard of claim 13 wherein at least one of said large and small lights are white light-emitting diodes.

* * * * *